US012320513B2

(12) United States Patent
Jiang

(10) Patent No.: US 12,320,513 B2
(45) Date of Patent: Jun. 3, 2025

(54) LIGHT HEAD WITH AUXILIARY HEAT DISSIPATION AND STAGE LIGHT FIXTURE HAVING SAME

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/240,656

(22) Filed: Aug. 31, 2023

(65) Prior Publication Data

US 2025/0003582 A1 Jan. 2, 2025

(30) Foreign Application Priority Data

Jun. 29, 2023 (CN) ......................... 202321678294.4

(51) Int. Cl.

*F21V 29/67* (2015.01)
*F21V 21/29* (2006.01)
*F21V 29/507* (2015.01)
*F21W 131/406* (2006.01)

(52) U.S. Cl.

CPC ............ *F21V 29/673* (2015.01); *F21V 21/29* (2013.01); *F21V 29/507* (2015.01); *F21W 2131/406* (2013.01)

(58) Field of Classification Search

CPC ...... F21V 29/673; F21V 29/507; F21V 29/29; F21W 2131/406

See application file for complete search history.

(56) References Cited

U.S. PATENT DOCUMENTS

| | | | | | |
|---|---|---|---|---|---|
| 4,701,833 | A * | 10/1987 | Bornhorst | F21V 29/673 | 362/426 |
| 7,021,793 | B2 * | 4/2006 | Biasoli | F21S 8/022 | 362/153.1 |
| 7,144,135 | B2 * | 12/2006 | Martin | F21S 6/003 | 362/345 |
| 8,087,803 | B2 * | 1/2012 | Zheng | F21V 29/77 | 362/373 |
| 8,514,574 | B2 * | 8/2013 | Fu | H05K 7/20727 | 165/185 |
| 9,671,101 | B2 * | 6/2017 | Lei | F21V 29/677 | |

(Continued)

FOREIGN PATENT DOCUMENTS

| | | |
|---|---|---|
| CN | 211176620 U | 8/2020 |
| CN | 213362390 U | 6/2021 |

(Continued)

*Primary Examiner* — Arman B Fallahkhair

(74) *Attorney, Agent, or Firm* — MUNCY, GEISSLER, OLDS & LOWE, P.C.

(57) ABSTRACT

A light head with auxiliary heat dissipation includes a housing having a light outlet and a light-outgoing lens assembly being arranged at the light outlet. A cover plate is provided at the outer side of the housing. A heat-dissipating air passage is formed between the housing and the cover plate along the length direction of the housing, and both ends of the heat-dissipating air passage are respectively provided with a first air vent and a second air vent. A first air blower is further included for blowing the air in the heat-dissipating air passage to flow between the first air vent and the second air vent.

19 Claims, 9 Drawing Sheets

(56) References Cited

U.S. PATENT DOCUMENTS

| | | | | |
|---|---|---|---|---|
| 10,072,834 | B2 * | 9/2018 | Kjaer | F21V 29/70 |
| 10,161,618 | B2 * | 12/2018 | Quadri | F21V 29/61 |
| 10,895,375 | B2 | 1/2021 | Zhou | |
| 2006/0193139 | A1 * | 8/2006 | Sun | F21V 29/67<br>362/373 |

FOREIGN PATENT DOCUMENTS

| | | | |
|---|---|---|---|
| CN | 114526455 | A | 5/2022 |
| CN | 218993348 | U | 5/2023 |
| FR | 3034173 | A1 | 9/2016 |
| WO | WO-2021184946 | A1 | 9/2021 |
| WO | WO-2022157125 | A1 | 7/2022 |

* cited by examiner

LIGHT HEAD WITH AUXILIARY HEAT DISSIPATION AND STAGE LIGHT FIXTURE HAVING SAME

CROSS REFERENCE TO RELATED APPLICATIONS

The present application claims priorities from Chinese Application No. CN 202321678294.4 filed on Jun. 29, 2023, all of which are hereby incorporated herein by reference.

TECHNICAL FIELD

The present invention relates to the technical field of stage light fixtures, and more particularly, relates to a light head with auxiliary heat dissipation and a stage light fixture having the same.

BACKGROUND

As known, outdoor arenas can not only accommodate more audiences, but also bring different kinds of elements for performance, such as light effects of fireworks or water smoke, to produce good atmosphere for stage performance. At the same time, open-air performance poses large challenge for waterproof property of the stage light fixture.

Typically, the light head for waterproof stage light fixture includes a metal housing with two inside chambers. One enclosed chamber is for encompassing the light source and other important electronic elements. The other chamber is in air communication with the outside of the light head as a heat-dissipating chamber, in which a radiator with a heat-absorbing plate close to the light source is arranged. For such light fixture, the heat in the light head is mainly dissipated through the radiator and with the aid of heat exchange between the metal housing and the outside.

However, with the growing power increase of the electronic elements in the light head, especially the light source, it is difficult to satisfy the dissipating demands for the high-power light fixtures by passive heat-conducting method for the conventional light fixtures.

SUMMARY

As such, it is the object of the present invention to provide an improved light head with auxiliary heat dissipation and a stage light fixture having the same, which can achieve heat dissipation efficiently by active air convection.

According to the present invention, the light head with auxiliary heat dissipation includes a housing having a light outlet and a light-outgoing lens assembly being arranged at the light outlet. A cover plate is provided at the outer side of the housing. A heat-dissipating air passage is formed between the housing and the cover plate along the length direction of the housing, and both ends of the heat-dissipating air passage are respectively provided with a first air vent and a second air vent. A first air blower is further included for blowing the air in the heat-dissipating air passage to flow between the first air vent and the second air vent, such as from the first air vent to the second air vent or from the second air vent to the first air vent.

The conventional light head dissipates heat only through the outer side walls of the housing via heat exchange between the outside thereof. However, auxiliary heat dissipation is formed in the present invention in a way that a heat-dissipating air passage is additionally formed by the housing and the cover plate and the first air blower is configured to flow the air in the heat-dissipating air passage, such flowing air thus can rapidly remove the heat outside the housing. In addition, the first air vent and the second air vent are respective disposed at opposite sides of the housing, which can prolong the course of the air in the heat-dissipating air passage as possible, resulting in increased heat-dissipating area of the housing, thereby achieving improved heat-dissipating efficient of the whole light head.

In addition, along a length direction thereof, the housing is divided into a mounting chamber for mounting a light source, an effect assembly, and a lens assembly, and a heat-dissipating chamber for mounting a radiator for the light source by a spacer. The heat-dissipating chamber is in air communication with the outside of the light head. The radiator includes a second air blower for blowing the air in the heat-dissipating chamber to exchange with the outside. As known, the effect assembly and the lens assembly in the mounting chamber generally generate substantial heat during operation thereof. With such configuration, the heat in the mounting chamber will be transferred to the heat-dissipating chamber and the heat-dissipating air passage, and finally dissipated to the outside of the light head via the heat-dissipating chamber and the heat-dissipating air passage. Compared to the traditional waterproof light fixture, adding the heat-dissipating air passage for auxiliary heat dissipation can effectively improve heat-dissipating efficiency of the whole light fixture.

In order to further improve heat-dissipating efficiency of the whole light fixture, the heat-dissipating air passage is in air communication with the heat-dissipating chamber through the second air vent in the present invention. In such configuration, the air in the heat-dissipating air passage can be flowed much quickly with the help of the second air blower.

The second air vent is preferably formed as at least one through hole arranged in the housing according to the present invention. The structure of through hole is simple, and no additional components are required to build the second air vent, which thus is more convenient to process.

Particularly, the housing includes two opposite side support plates which are respectively connected to a pivot shaft. In such case, the cover plate is disposed at the outside of the side support plates. That is, the heat-dissipating air passage is configured to cool the side support plates of the housing, assuring quick heat dissipation thereof.

The housing may further include at least two additional shells, the two shells and two side support plates together form the housing, especially assembled in a spliced way, such way is convenient to process and mount.

Particularly, the cover plate is formed by splicing the at least two shells. That is, the cover plate and the shells are integrally formed, which is easy to process and mount for the stage light.

In order to simultaneously achieve effective heat-dissipating efficiency and meet demands of light weight of the stage light fixture, the side support plates are preferably made of metal material, while the shells are preferably made of plastic material. As known, metal material has good heat-conduction performance, so that as a portion of the heat-dissipating air passage metal side support plates can effectively conduct heat inside the light head to the heat-dissipating air passage. While the plastic shells have property of light weight and easy to process, which can effectively reduce the whole weight of the light head.

In the present invention, the light-outgoing lens assembly may be disposed at the light outlet through a mounting plate and a lens cover is coved thereon. The center of the lens cover has a light-passing hole corresponding to the lens of the light-outgoing lens assembly. In this case, the light-outgoing lens assembly is accommodated in an accommodating chamber formed by the mounting plate and the lens cover, and the first air vent is in air communication with the accommodating chamber. It should be known that during operation of the stage light fixture, high-power light beams projected through the lens of the light-outgoing lens assembly may cause the light-outgoing lens assembly in high temperature. However, such configuration of the present invention can avoid damage of the light-outgoing lens assembly due to too high temperature. With the air communication of the accommodating chamber and the heat-dissipating air passage according to the present invention, the air will flow through the accommodating chamber to remove the heat of the light-outgoing lens assembly during heat dissipation of the light head.

In addition, the first air blower is preferably disposed in the accommodating chamber through a mounting holder and an air-conducting passage is provided between the first air blower and the first air vent. Such configuration can avoid air turbulence due to air leak between the first air blower and the first air vent, effectively leading air to flow along the preset direction, thereby assuring heat-dissipating efficiency.

In a bid to facilitate hot air in the heat-dissipating air passage flowing out conveniently, or cold air conveniently entering the heat-dissipating air passage, the lens cover may be provided a plurality of air-transmission holes for allowing the accommodating chamber in air communication with the outside of the light head. Alternatively, an air-transmission gap is formed between the lens cover and the lens of the light-outgoing lens assembly, which allows the accommodating chamber in air communication with the outside of the light head, and/or further air-transmission gap is formed between the lens cover and the mounting plate to allow the accommodating chamber in air communication with the outside of the light head. With the configuration of the air-transmission holes and the air-transmission gaps, hot air in the heat-dissipating air passage thus can flow out conveniently, or cold air can conveniently enter the heat-dissipating air passage through the air-transmission holes or gaps.

According to the present invention, the upper end of the housing may be higher than the mounting plate, the periphery edge of the lens cover is abutted against the upper end of the housing. In this case, in addition to a portion of the housing corresponding to the cover plate, a segment of the housing higher the mounting plate is provided with a plurality of through holes allowing the accommodating chamber in air communication with the outside of the light head. The configuration of the through holes can increase the heat exchange aera between the light fixture and the outside and facilitate the water in the mounting plate discharging to avoid damage of the light source or other electronic elements due to too much water entering the inner of the light head.

The mounting plate is particularly provided a plurality of heat-conducting fins at a side close to the accommodating chamber according to the present invention. The heat-conducting fins can increase the heat-dissipating area of the mounting plate. In such configuration, the heat in the housing may be transmitted to the mounting plate, further to the accommodating chamber through the heat-conducting fins. Therefore, improved heat-dissipating effect can be achieved.

To further improve efficiency of the heat dissipation, a plurality of heat-dissipating ribs along the length direction of the cover plate may be further provided on the outer side and/or the inner side of the housing corresponding to the range of the cover plate according to the present invention. Such arrangement forms a plurality of air-flow passages parallel to the cover plate, so that air entering the auxiliary heat-dissipating air passage can flow along the length direction of the cover plate. The plurality of heat-dissipating ribs can also increase the heat-dissipating area.

The first air blower is preferably disposed close to the first air vent and/or the second air vent according to the present invention. In such easy way, the rate at which air flows out/in the heat-dissipating passage can be accelerated, thereby further improving the heat-dissipating efficiency of the whole light head.

Additionally, the first air blower is disposed close to the first air vent or the second air vent, the air inlet of the first air blower faces towards the heat-dissipating passage and is configured to blow the air therein away from the heat-dissipating passage, and the cover plate away from the mounting position of the first air blower is provided with air-transmission grids. With such configuration, after the air is blown away from the heat-dissipating passage, the air outside will enter through the air-transmission grids due to pressure difference. Furthermore, the arrangement of the air-transmission grids away from the first air blower can further prolong the course of the air in the heat-dissipating air passage, which thus can uniformly remove heat of the housing as much as possible.

On the other hand, a light fixture having the light head as defined above is further provided. The stage light fixture further includes a support arm, the light head being pivoted to the support arm, allowing the light head to rotate in at least one direction relative to the support arm. Therefore, light beams can be projected in different directions to generate varied stage effects.

DETAILED DESCRIPTION

Figure 1:
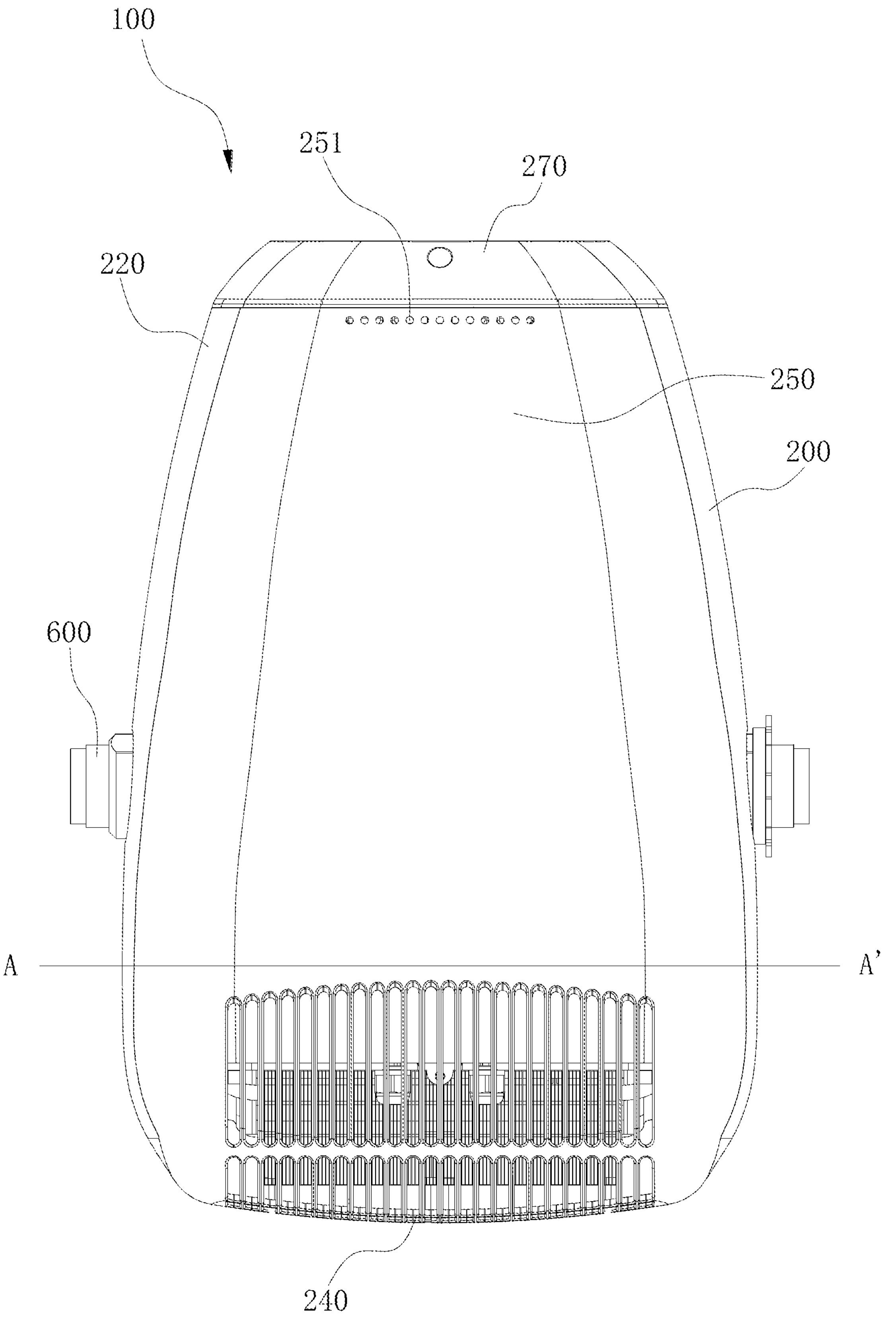
FIG. 1 is a structural view of a light head according to an embodiment of the present invention.
Figure 2:
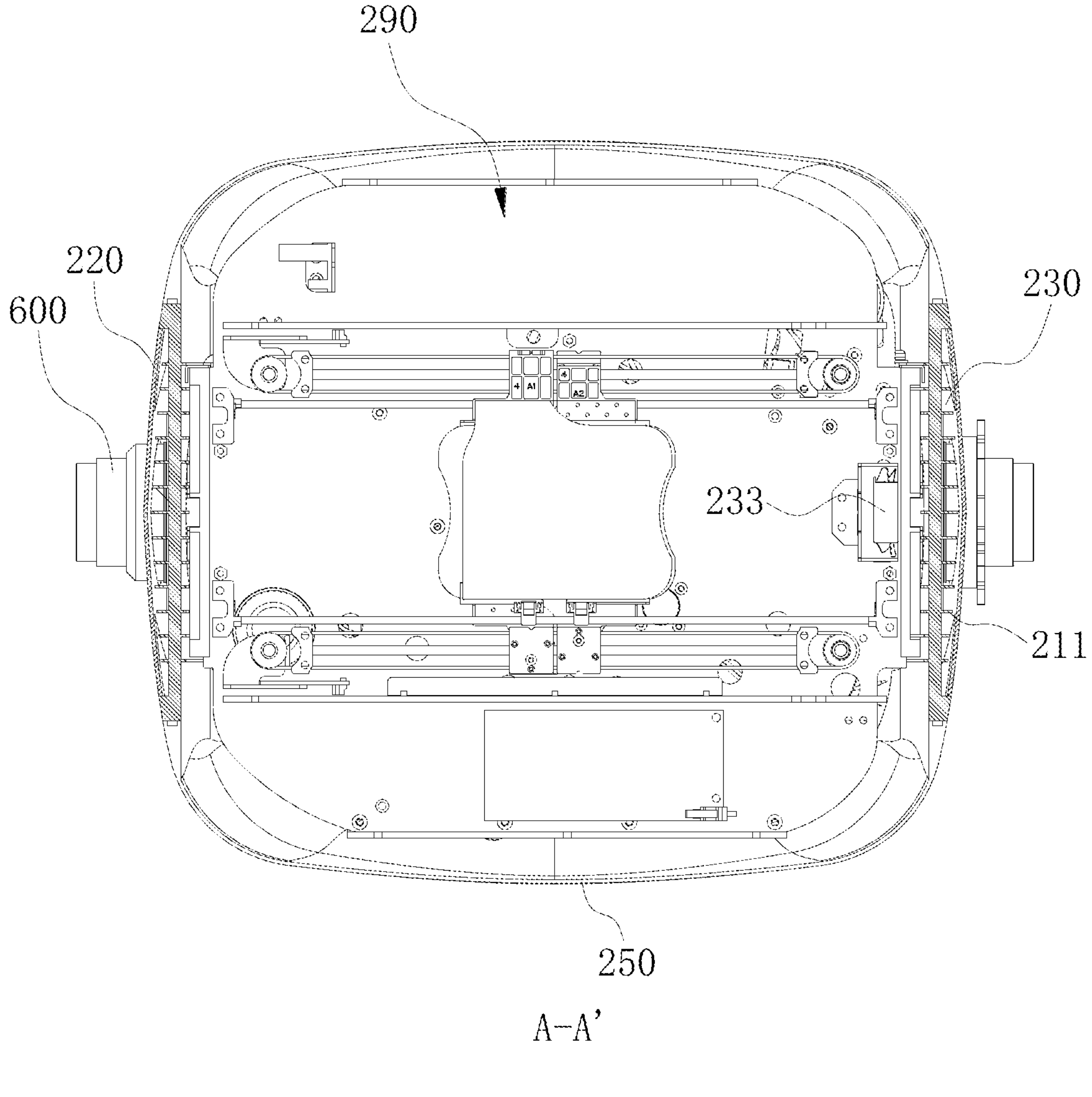
FIG. 2 is a sectional view of the light head of FIG. 1 along A-A'.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 3:
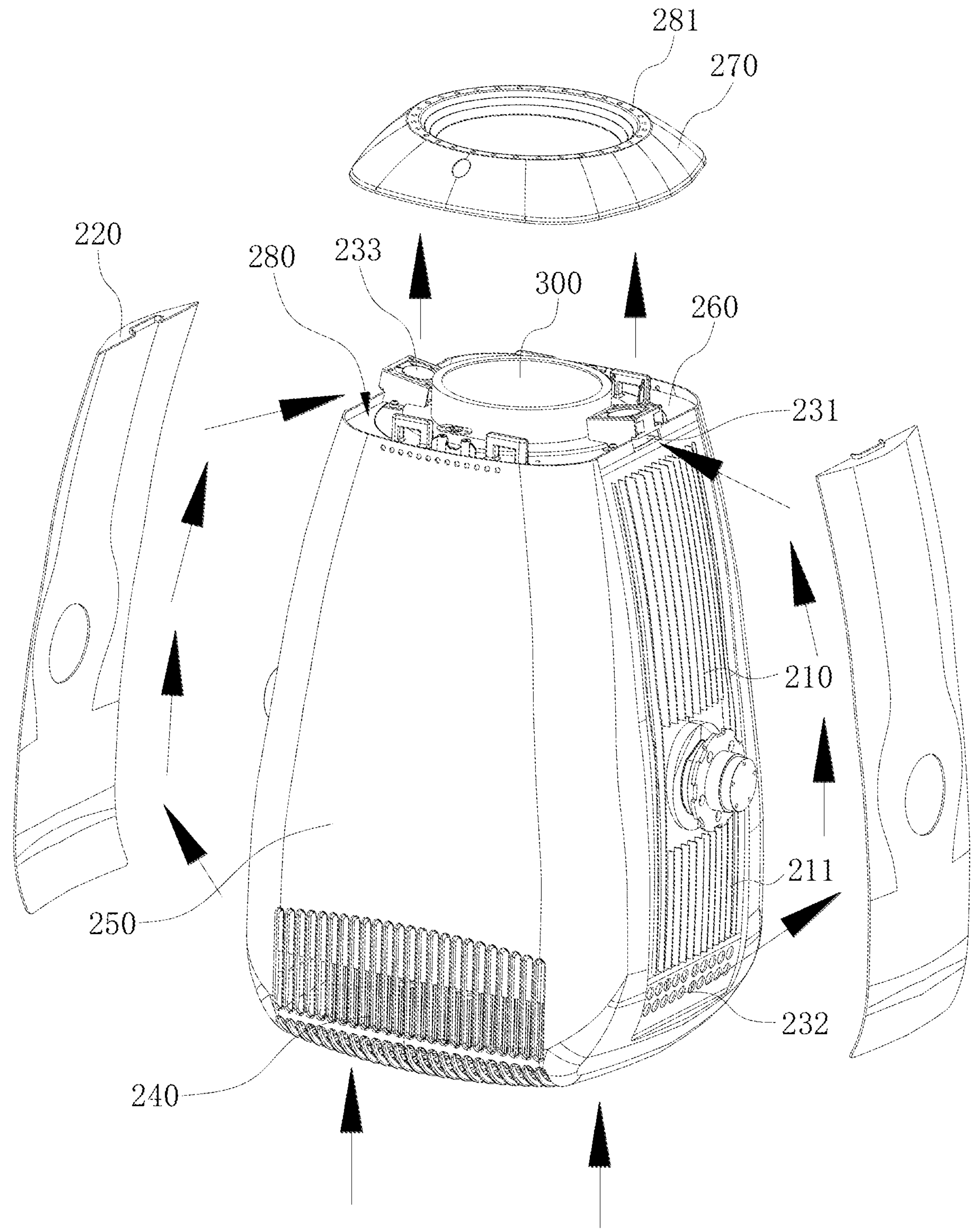
FIG. 3 is a view showing direction of air flow according to an embodiment of the present invention, with a first air vent as an air outlet and a second air vent as an air inlet of a heat-dissipating air passage.
Figure 4:
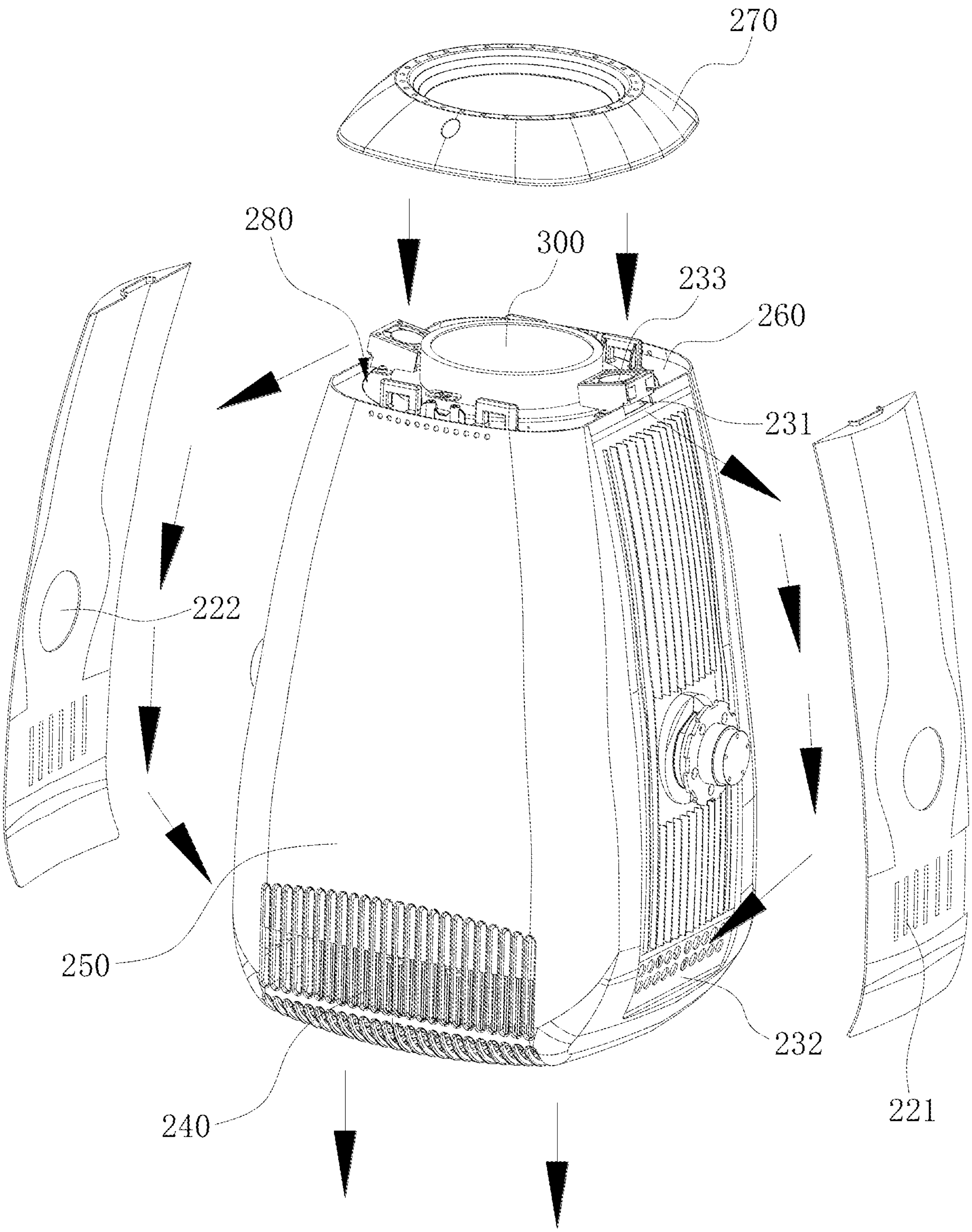
FIG. 4 is another view showing direction of air flow according to an embodiment of the present invention, with a first air vent as an air inlet and a second air vent as an air outlet of a heat-dissipating air passage.

FIGS. 1-4 shows a light head 100 with auxiliary heat dissipation is provided according to an embodiment of the present invention, which includes a housing 200 having a light outlet and a light-outgoing lens assembly 300 being arranged at the light outlet. The housing 200 includes two opposite side support plates 210 which are respectively connected to a pivot shaft 600. Under power, the light head 100 can rotate around the pivot shaft 600. A cover plate 220 is provided at the outer side of each side support plate 210. Referring to FIGS. 3 and 4, a heat-dissipating air passage 230 is formed between each side support plate 210 and the corresponding cover plate 220 along the length direction of the housing 200, i.e. the direction of the light outgoing. Both ends of the heat-dissipating air passage 230 are respectively provided with a first air vent 231 and a second air vent 232. A first air blower 233 is further included for blowing the air in the heat-dissipating air passage 230 to flow between the first air vent 231 and the second air vent 232, i.e. flow from the first air vent 231 to the second air vent 232, or flow from the second air vent 232 to the first air vent 231.

The conventional light head dissipates heat only through the outer side walls of the housing via heat exchange between the outside thereof. However, auxiliary heat dissipation is formed in the present embodiment in a way that a heat-dissipating air passage 230 is defined by the side support plate 210 and the corresponding cover plate 220 at opposite sides of the light head, and the first air blower 233 is configured to flow the air in the heat-dissipating air passage 230, such flowing air thus can rapidly remove the heat outside each side support plate 210. In addition, the first air vent 231 and the second air vent 232 are respective provided at opposite sides of the housing 220, which can prolong the course of the air in the heat-dissipating air passage 230 as possible, resulting in increased heat-dissipating area of the housing 200, thereby achieving improved heat-dissipating efficient of the whole light head 100.

According to a preferable embodiment, the pivot shaft 600 is directly disposed to the side support plate 210. Accordingly, each cover plate 220 is provided with an avoiding hole 222 corresponding to the pivot shaft 600, so that when the side support plate 210 is assembled with the cover plate 220, the pivot shaft 600 passes through the avoiding hole 222.

In order to allow cold air entering the heat-dissipating air passage 230 to form air circulation by pressure difference between the heat-dissipating air passage 230 and outside of the light head, the first air blower 233 may be designed to blow air outside the light head 100 to the heat-dissipating air passage 230, or may also be designed to extract hot air in the heat-dissipating air passage 230 to the outside.

The cover plate 220 can be preferably fastened with the side support plate 210 by a snap-fitting arrangement or by screw connection. However, any other connection methods in the prior art can also be used, which is not exhaustive and limited here.

The first air vent 231 and the second air vent 232 are preferably disposed in the side support plate 210 according to an embodiment of the present invention, as FIGS. 3 and 4 shown. The number of the first air blower 233 may be multiple according to design demands.

According to a preferable embodiment, along a length direction thereof, the housing 200 is divided into a mounting chamber 290 for mounting a light source 700, an effect assembly 800, and a lens assembly 900 and a heat-dissipating chamber 240 for mounting a radiator 241 for the light source by a spacer. Referring to FIGS. 3-6, the heat-dissipating chamber 240 is in air communication with the outside of the light head 100 and the heat-dissipating air passage 230 can also be in air communication with the heat-dissipating chamber 240 through the second air vent 232. The radiator 241 includes a second air blower 242 for blowing the air in the heat-dissipating chamber 240 to exchange with the outside. As known, the effect assembly 800 and the lens assembly 900 in the mounting chamber 290 generally generate substantial heat during operation thereof. With such configuration, the heat in the mounting chamber 290 will be transferred to the heat-dissipating chamber 240 and the heat-dissipating air passage 230, and finally dissipated to the outside of the light head via the heat-dissipating chamber 240 and the heat-dissipating air passage 230. Compared to the traditional waterproof light fixture, adding the heat-dissipating air passage 230 for auxiliary heat dissipation can effectively improve heat-dissipating efficiency of the whole light fixture.

According to an embodiment of the present invention, the light emitted from the light source 700 is projected through the light-outgoing lens assembly 300 after sequentially passing the effect assembly 800 and the lens assembly 900. Particularly, the effect assembly 800 includes at least one of a CMY assembly, color filter assembly, pattern wheel or fire wheel. The lens assembly 900 includes at least one of a magnifying assembly, a focusing assembly or a fixed lens assembly.

In a preferable embodiment of the present invention, the mounting chamber 290 is in an enclosed state. The radiator 241 further includes a plurality of heat-dissipating fins 243, among which a further air passage is formed. The mounting chamber 290 can be heat dissipated by blowing hot air to flow in the air passage via the second air blower 242. In such way, the mounting chamber 290 can be waterproof and dustproof, as well has the ability of promptly dissipating heat in the mounting chamber 290 by the heat-dissipating chamber 240.

The second air vent 232 is preferably formed as through holes arranged in each side support plate 210. The structure of through holes is simple, and no additional components are required to build the second air vent 232, which thus is more convenient to process. More preferably, the second air vent 232 is designed as various through holes in multiple rows.

Figure 7:
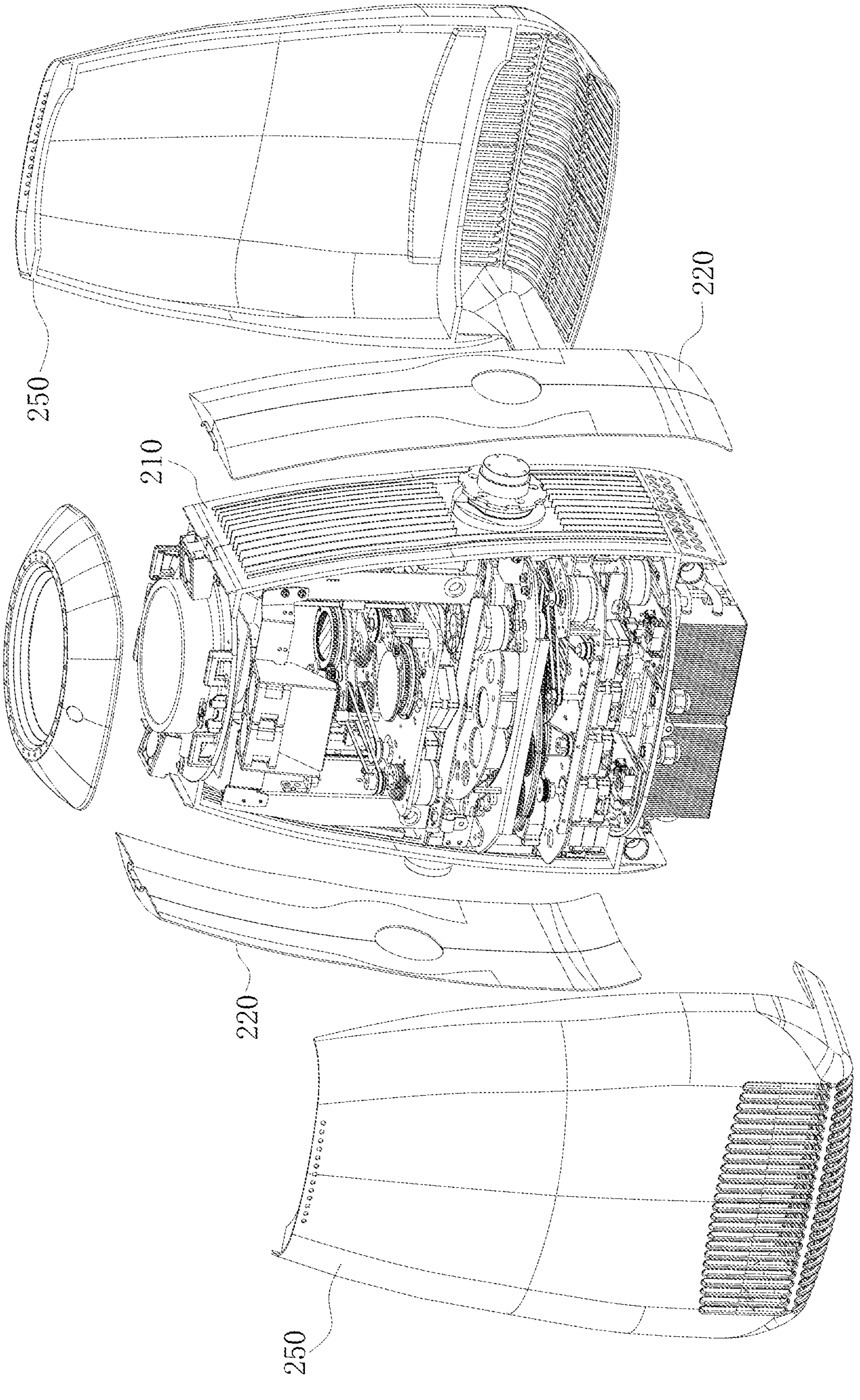
FIG. 7 is a structural view showing the cover plate is independently arranged outside the housing.

In another preferable embodiment, as FIG. 7 shown, the housing 200 further includes two shells 250, the two shells 250 and two side support plates together define the housing 200, especially assembled in a spliced way, such way is convenient to process and mount. In this embodiment, the cover plate 220 is independently arranged outside the housing 200.

Figure 8:
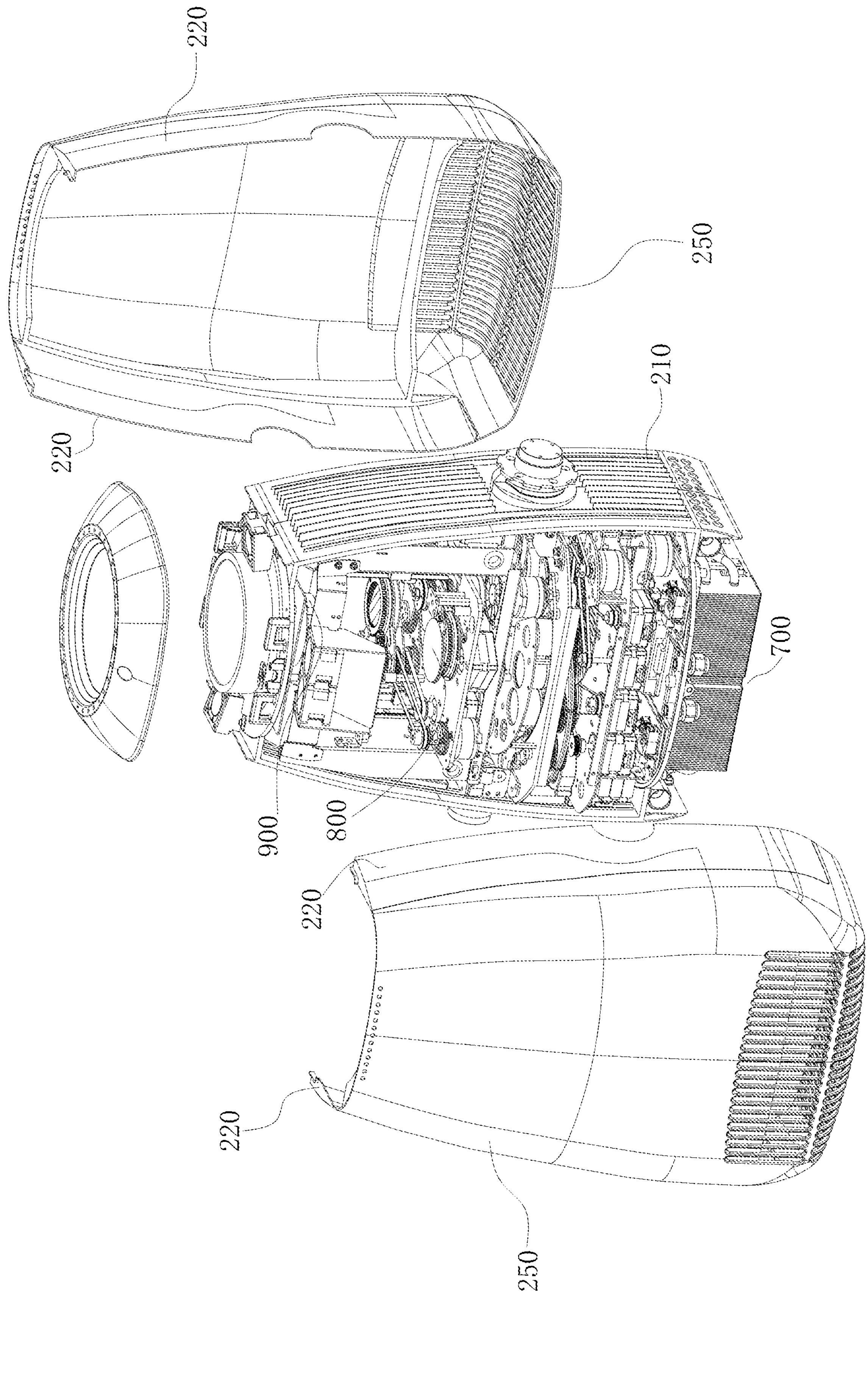
FIG. 8 is a structural view showing the cover plate is formed by splicing two shells.

However, in the other embodiments, as shown in FIG. 8, the cover plate 220 can be formed by splicing the shells 250. In this embodiment, the cover plate 220 and the shells 250 are integrally formed, which is easy to process and mount for the stage light.

The two shells 250 are arranged oppositely. In this embodiment, the both sides of each cover plate 220 is respectively abutted with the edges of the opposite shells 250, so that smooth transition is formed between the shell 250 and the corresponding cover plate 220.

In a preferable embodiment, the side support plate 210 is made of metal material, while the shell 250 is made of plastic material. As known, metal material has good heat-conduction performance, so that as a portion of the heat-dissipating air passage 230, metal side support plates 210 can effectively conduct heat inside the light head 100 to the heat-dissipating air passage 230. While the plastic shells 150 have property of light weight and easy to process, which can effectively reduce the whole weight of the light head 100. Such combination thus can achieve effective heat-dissipating efficiency, but also meet demands of light weight of the stage light fixture.

Referring to FIGS. 3-4, according to an preferable embodiment of the present invention, the light-outgoing lens assembly 300 is disposed at the light outlet through a mounting plate 260 and a lens cover 270 is coved thereon. The center of the lens cover 270 has a light-passing hole corresponding to the lens of the light-outgoing lens assembly 300. In this embodiment, the light-outgoing lens assembly 300 is accommodated in an accommodating chamber 280 formed by the mounting plate 260 and the lens cover 270. In this embodiment, the first air vent 231 is in air communication with the accommodating chamber 280. It should be known that during operation of the stage light fixture, high-power light beams projected through the lens of the light-outgoing lens assembly 300 may cause the light-outgoing lens assembly 300 in high temperature. In such configuration, with the air communication of the accommodating chamber 280 and the heat-dissipating air passage 230, the air will flow through the accommodating chamber 280 to remove the heat of the light-outgoing lens assembly 300 during heat dissipation of the light head 100, thus avoiding damage of the light-outgoing lens assembly 300 due to too high temperature.

On the other hand, the cold air from the second air vent 232 will become hot air in high temperature when flowing to the first air vent 231, such hot air then enters the accommodating chamber 280 through the lens of the light-outgoing lens assembly 300, which can eliminate fog on the lens.

As shown in FIG. 3, according to an embodiment, the second air vent 232 is the air inlet of the heat-dissipating air passage 230 and the first air vent 231 is the air outlet thereof. In this case, the first air vent 231 and the second air vent 232 are both provided with a first air blower 233, so that cold air enters the heat-dissipating chamber 240 from the outside, then is blown into the heat-dissipating air passage 230 by the first air blower 233 and entered the accommodating chamber 280 through the first air vent 231, and finally discharged to the outside through an air-transmission hole 281 or an air-transmission gap (will be depicted below).

In an alternative embodiment, as FIG. 4 shown, the first air vent 231 is the air inlet of the heat-dissipating air passage 230 and the second air vent 232 is the air outlet thereof. In this case, the first air vent 231 and the second air vent 232 are both provided with a first air blower 233, so that cold air enters the accommodating chamber 280 from the outside, then is blown into the heat-dissipating air passage 230 by the first air blower 233 and entered the heat-dissipating chamber 240 through the second air vent 232, and finally discharged to the outside.

Further, an anti-dazzle structure, such as a stepped anti-dazzle ring is provided at the inner side of the light-passing hole.

In a preferable embodiment of the present invention, the first air blower 233 is disposed in the accommodating chamber 280 through a mounting holder and an air-conducting passage is provided between the first air blower 233 and the first air vent 231. Such configuration can avoid air turbulence due to air leak between the first air blower 233 and the first air vent 231, effectively leading air to flow along the preset direction, thus assuring heat-dissipating efficiency.

Preferable, the air-conducting passage is formed by the mounting holder, which can save material and convenient to mount.

Additionally, the side support plate 210 is provided with a mounting portion corresponding to the first air blower 233. With the first air blower 233 embedded into the mounting portion, air leak can be further prevented.

In a preferable embodiment, in combination with FIGS. 1 and 3-6, the lens cover 270 may be provided a plurality of air-transmission holes 281 for allowing the accommodating chamber 280 in air communication with the outside of the light head 100. Additionally or alternatively, an air-transmission gap is formed between the lens cover 270 and the lens of the light-outgoing lens assembly 300, which allows the accommodating chamber 280 in air communication with the outside of the light head 100, and/or further air-transmission gap is formed between the lens cover 270 and the mounting plate 260 to allow the accommodating chamber 280 in air communication with the outside of the light head 100. With the configuration of the air-transmission holes and the air-transmission gaps, hot air in the heat-dissipating air passage 230 can flow out conveniently, or cold air can conveniently enter the heat-dissipating air passage 230 through the air-transmission holes or gaps.

In combination with FIGS. 3-6, in another preferable embodiment of the present invention, the upper end of the housing 200 is higher than the mounting plate 260, the periphery edge of the lens cover 270 is abutted against the upper end of the housing 200. In this embodiment, in addition to the side support plate 210, a segment portion of the housing 200 higher the mounting plate 260 is provided with a plurality of through holes 251 allowing the accommodating chamber 280 in air communication with the outside of the light head 100. The configuration of the through holes 251 can increase the heat exchange area between the light fixture and the outside and facilitate the water in the mounting plate 260 discharging to avoid too much water entering the inner of the light head.

Figure 9:
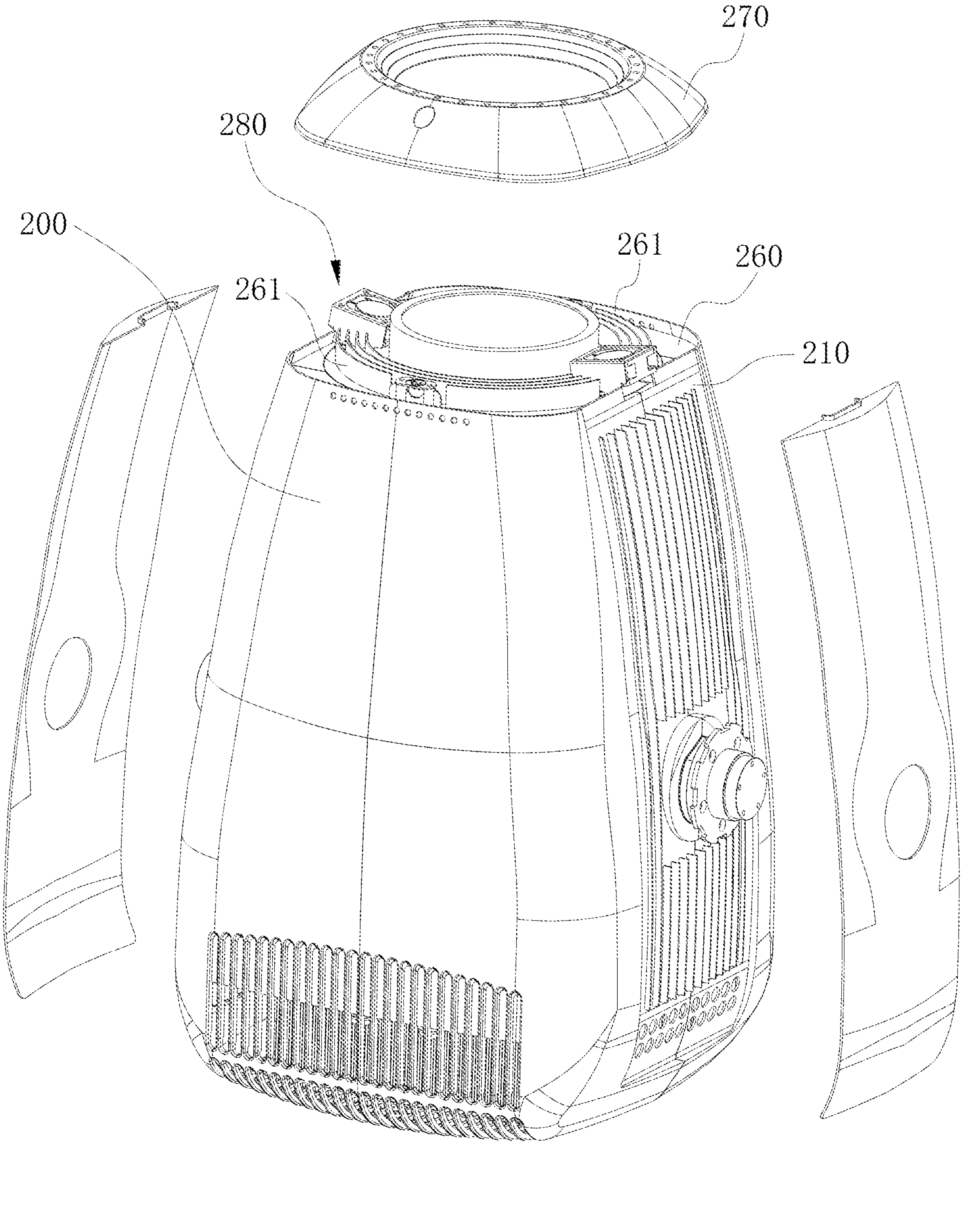
FIG. 9 is a structural view showing the mounting plate is provided with heat-conducting fins.

With reference to FIG. 3 and FIG. 9, the mounting plate 260 is preferably provided a plurality of heat-conducting fins 261 at a side close to the accommodating chamber 280. The heat-conducting fins 261 can increase the heat-dissipating area of the mounting plate 260. In such configuration, the heat in the housing 200 may be transmitted to the mounting plate 260, further to the accommodating chamber 280 through the heat-conducting fins 261. Therefore, improved heat-dissipating effect can be achieved.

More preferably, the heat-conducting fins 261 are arranged in parallel to form several air ducts. In such way, the air in the accommodating chamber 280 will flow along such air ducts, thereby increasing the flowing course of the air, resulting in more improved heat dissipating effect of the accommodating chamber 280.

Figure 6:
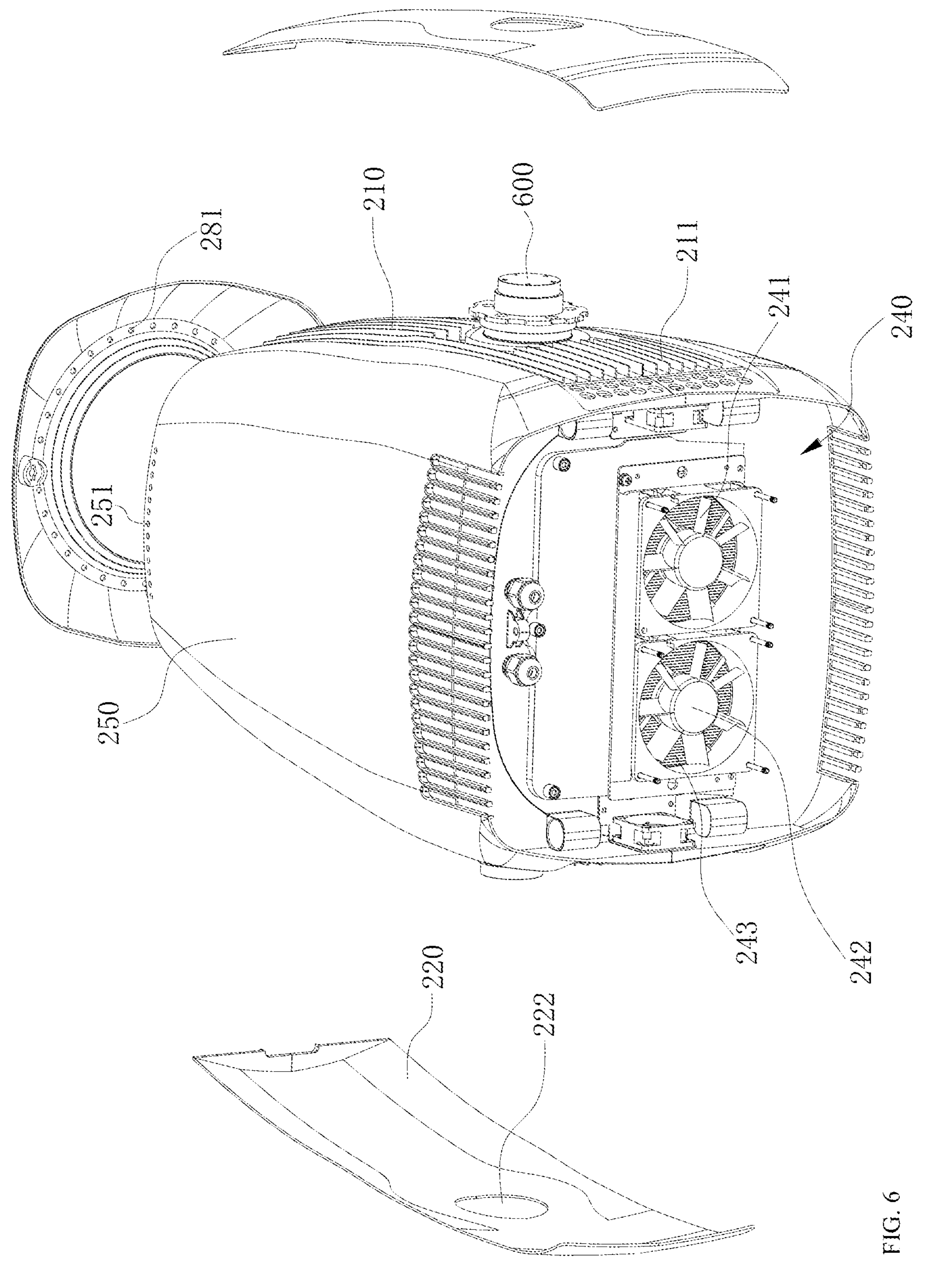
FIG. 6 is an exploded structural view of a light head according to an embodiment of the present invention.

Regarding FIGS. 3 and 6, a plurality of heat-dissipating ribs 211 can be further provided on the outer side and/or the inner side of each side support plate 210 along the length direction of the side support plate 210, according to a preferable embodiment of the present invention. Such arrangement forms a plurality of air-flow passages parallel to the side support plate 210, so that air entering the auxiliary heat-dissipating air passage can flow along the length direction of the side support plate 210. Furthermore, the plurality of heat-dissipating ribs 211 can increase the heat-dissipating area. In particular, the heat-dissipating ribs 211 extend from the first air vent 231 to the second air vent 232, with avoiding the pivot shaft 600.

To accelerate the rate at which air flows out/in the heat-dissipating passage 230 and thus further improve the heat-dissipating efficiency, the first air blower 233 is disposed close to the first air vent 231 and/or the second air vent 232 according to a preferable embodiment of the present invention.

In this embodiment, the first air blower 233 is disposed close to the first air vent 231 or the second air vent 232, the air inlet of the first air blower 233 faces towards the heat-dissipating passage 230 and blow the air therein away from the heat-dissipating passage 230, and the cover plate 220 away from the mounting position of the first air blower 233 is provided with air-transmission grids 221. With such configuration, after the air is blown away from the heat-dissipating passage 230, the air outside will enter through the air-transmission grids 221 due to pressure difference. Furthermore, the arrangement of the air-transmission grids 221 away from the first air blower 233 can prolong the course of the air in the heat-dissipating air passage 230, which can uniformly remove heat of the side support plate 210 as much as possible.

Figure 5:
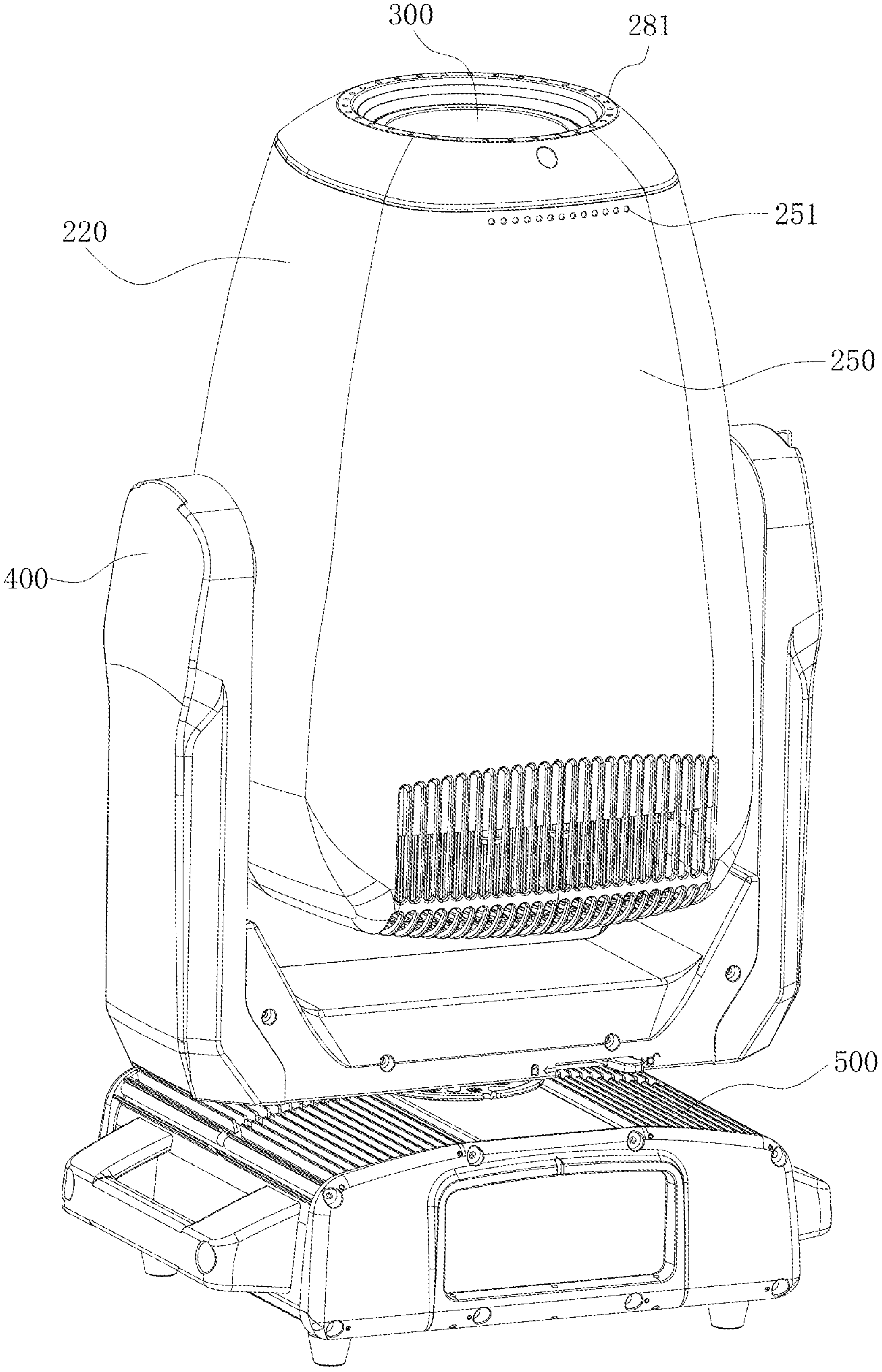
FIG. 5 is a structural view of a light fixture according to an embodiment of the present invention, with a light head pivoted to a bottom base via a support arm.

FIG. 5 depicts a stage light fixture having the stage head 100 in any embodiment mentioned above. The stage light fixture includes a support arm 400, the light head 100 is pivoted to the support arm 400, allowing the light head 100 to rotate in at least one direction relative to the support arm 400. Therefore, light beams can be projected in different directions to generate varied stage effects. Preferably, the light head 100 is pivoted to the support arm 400 by the pivot shaft 600.

Additionally, a bottom base 500 is preferable pivoted to the support arm 400, allowing the light head 100 to rotate in at least two directions relative to the support arm 400.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A light head with auxiliary heat dissipation, comprising:

- a housing having a light outlet, which comprises two opposite side support plates;
- a light-outgoing lens assembly being arranged at the light outlet; and
- a cover plate respectively surrounding an outer side of the two opposite side support plates,
- wherein a heat-dissipating air passage is formed between each side support plate and the cover plate along a substantially entire length direction of the housing, and both ends of the heat-dissipating air passage are respectively provided with a first air vent and a second air vent on each side support plate, and a first air blower is further provided for blowing air in the heat-dissipating air passage to flow between the first air vent and the second air vent.

2. The light head according to claim 1, wherein in the length direction thereof, the housing is divided into a mounting chamber for mounting a light source, an effect assembly, and a lens assembly, and a heat-dissipating chamber for mounting a radiator for the light source, the heat-dissipating chamber is in air communication with an outside of the light head, and the radiator has a second air blower for blowing air in the heat-dissipating chamber to exchange with the outside of the light head.

3. The light head according to claim 2, wherein the heat-dissipating air passage is in air communication with the heat-dissipating chamber through the second air vent.

4. The light head according to claim 3, wherein the second air vent is formed as at least one through hole in a side wall of the two opposite side support plates.

5. The light head according to claim 1, wherein the light-outgoing lens assembly is disposed at the light outlet through a mounting plate on which a lens cover is coved, a center of the lens cover has a light-passing hole corresponding to a lens of the light-outgoing lens assembly, and an accommodating chamber formed by the mounting plate and the lens cover is in air communication with the first air vent.

6. The light head according to claim 5, wherein the first air blower is disposed in the accommodating chamber through a mounting holder and an air-conducting passage is provided between the first air blower and the first air vent.

7. The light head according to claim 5, wherein the lens cover is provided with a plurality of air-transmission holes for allowing the accommodating chamber in air communication with the outside of the light head.

8. The light head according to claim 5, wherein an air-transmission gap is formed between the lens cover and the lens of the light-outgoing lens assembly, which allows the accommodating chamber in air communication with the outside of the light head, and/or a further air-transmission gap is formed between the lens cover and the mounting plate for allowing the accommodating chamber in air communication with the outside of the light head.

9. The light head according to claim 5, wherein an upper end of the housing is higher than the mounting plate, a periphery edge of the lens cover is abutted against the upper end of the housing, and in addition to a portion of the housing corresponding to the cover plate, a segment of the housing higher the mounting plate is provided with a plurality of through holes allowing the accommodating chamber in air communication with the outside of the light head.

10. The light head according to claim 5, wherein the mounting plate is provided a plurality of heat-conducting fins at a side close to the accommodating chamber.

11. The light head according to claim 1, wherein the housing further comprises at least two shells, the housing being defined by the at least two shells and the two side support plates together.

12. The light head according to claim 11, wherein the cover plate is formed by splicing the at least two shells.

13. The light head according to claim 11, wherein the side support plates are made of metal material and the shells are made of plastic material.

14. A stage light fixture, comprising the light head according to claim 1 and a support arm pivoted to the light head.

15. The stage light fixture according to claim 14, a bottom base is pivoted to the support arm, allowing the light head to rotate in at least two directions relative to the support arm.

16. The light head according to claim 1, wherein each side support plate is connected to a pivot shaft.

17. The light head according to claim 1, wherein a plurality of heat-dissipating ribs along a length direction of the cover plate is further provided on the outer side and/or an inner side of the housing corresponding to a range of the cover plate.

18. The light head according to claim 1, wherein the first air blower is disposed close to at least one of the first air vent and/or the second air vent.

19. The light head according to claim 18, wherein the first air blower is disposed close to at least one of the first air vent and the second air vent, an air inlet of the first air blower faces towards the heat-dissipating passage and is configured to blow the air therein away from the heat-dissipating passage, and the cover plate away from a mounting position of the first air blower is provided with air-transmission grids.

* * * * *